United States Patent
Jang

(10) Patent No.: US 12,555,039 B2
(45) Date of Patent: Feb. 17, 2026

(54) BIG DATA-BASED MODULAR AI ENGINE SERVER AND DRIVING METHOD OF THE SAME

(71) Applicant: DataCentric Co., Ltd., Anyang-si (KR)

(72) Inventor: Dong Hun Jang, Gwangju-si (KR)

(73) Assignee: DataCentric Co., Ltd., Anyang-si (KR)

( * ) Notice: Subject to any disclaimer, the term of this patent is extended or adjusted under 35 U.S.C. 154(b) by 557 days.

(21) Appl. No.: 18/041,857

(22) PCT Filed: Aug. 23, 2021

(86) PCT No.: PCT/KR2021/011190
§ 371 (c)(1),
(2) Date: Feb. 16, 2023

(87) PCT Pub. No.: WO2022/045697
PCT Pub. Date: Mar. 3, 2022

(65) Prior Publication Data
US 2023/0297885 A1  Sep. 21, 2023

(30) Foreign Application Priority Data
Aug. 25, 2020 (KR) .......... 10-2020-0107066

(51) Int. Cl.
*G06N 20/00* (2019.01)
(52) U.S. Cl.
CPC .................. *G06N 20/00* (2019.01)
(58) Field of Classification Search
CPC ........ G06N 20/00; G06N 3/0499; G06N 3/09; G06N 3/048; H04L 67/12
See application file for complete search history.

(56) References Cited

U.S. PATENT DOCUMENTS

| | | | |
|---|---|---|---|
| 2019/0122121 A1 | 4/2019 | Yu | |
| 2020/0007409 A1* | 1/2020 | Kim | H04L 43/04 |
| 2020/0285891 A1* | 9/2020 | Yellin | H04L 67/34 |
| 2021/0174187 A1* | 6/2021 | Han | G10L 25/51 |
| 2021/0229274 A1* | 7/2021 | Lee | B25J 9/161 |
| 2021/0319311 A1* | 10/2021 | Shin | H05B 47/11 |

FOREIGN PATENT DOCUMENTS

| | | |
|---|---|---|
| KR | 10-2019-0081373 A | 7/2019 |
| KR | 10-2019-0134982 A | 12/2019 |
| KR | 10-2020-0002615 A | 1/2020 |
| KR | 10-2020-0057821 A | 5/2020 |
| KR | 10-2020-0080792 A | 7/2020 |

OTHER PUBLICATIONS

International Search Report issued in PCT/KR2021/011190; mailed Dec. 1, 2021.

* cited by examiner

*Primary Examiner* — Dave Misir
(74) *Attorney, Agent, or Firm* — Studebaker Brackett PLLC

(57) ABSTRACT

The present disclosure provides a big data-based modular AI engine server and a driving method thereof. The modular AI engine server of the present disclosure includes: a communication part configured to perform communication with at least one IoT device and a big data server; and a control part configured to determine an AI analysis model suitable for analyzing at least one piece of sensor data received from the IoT device, and analyze the sensor data by using the determined AI analysis model.

8 Claims, 7 Drawing Sheets

BIG DATA-BASED MODULAR AI ENGINE SERVER AND DRIVING METHOD OF THE SAME

CROSS-REFERENCE TO RELATED APPLICATIONS

This application is a National Phase of International Patent Application No. PCT/KR2021/011190 filed Aug. 23, 2021, which claims benefit of priority to Korean Patent Application No. 10-2020-0107066 filed Aug. 25, 2020, the entire content of which is incorporated herein by reference.

TECHNICAL FIELD

The present disclosure relates to a modular AI engine server. More particularly, the present disclosure relates to a big data-based modular AI engine server and a driving method thereof, wherein learning and data classification optimized for an internet of things (IoT) environment are performed in a modular manner.

BACKGROUND ART

In general, an internet of things (IoT) environment means an environment in which devices with built-in sensors or communication functions can collect ambient information through connection over the Internet, can exchange the information with other devices, and can make appropriate decisions to handle tasks by themselves.

As IoT devices to build the IoT environment have become diverse and the amount of data has increased, methods of sharing and transmitting collected data over the Internet regardless of time and place have begun to develop. A cloud computing system has been introduced, which rents and uses as many resources as needed in a cloud space, instead of a conventional method in which a company's server an individual's PC owns IT resources.

However, most cloud computing systems consist of high-end hardware and large-capacity storage, so it is difficult for small and medium-sized businesses to access a corresponding area due to costs.

DISCLOSURE

Technical Problem

The present disclosure is directed to providing a big data-based modular AI engine server and a driving method thereof, wherein an AI model suitable for an IoT environment is determined and the determined AI model is used to analyze sensor data.

In addition, the present disclosure is directed to providing a big data-based modular AI engine server and a driving method thereof, wherein an AI model is modularized and only a required AI model of the modular AI model is loaded and used.

In addition, the present disclosure is directed to providing a big data-based modular AI engine server and a driving method thereof, wherein connection to a cloud service is minimized through an AI model that performs learning independently and analysis.

Technical Solution

According to the present disclosure, there is provided a big data-based modular AI engine server including: a communication part configured to perform communication with at least one IoT device and a big data server; and a control part configured to determine an AI analysis model suitable for analyzing at least one piece of sensor data received from the IoT device, and analyze the sensor data by using the determined AI analysis model.

In addition, the control part may include: a model manager part configured to determine the AI analysis model suitable for analyzing the sensor data, in a modular manner on the basis of at least one selected from a group of a type of the IoT device, and a type and a format of the sensor data; and a hybrid analysis part configured to analyze the sensor data on the basis of the determined AI analysis model and a statistical analysis model and generate a driving control signal for the IoT device that has transmitted the sensor data.

In addition, the big data-based modular AI engine server may further include a storage part in which the AI analysis model and the statistical analysis model are stored in a modular manner and learning data resulting from learning based on a result of the analysis is stored.

In addition, when a reference factor for determining the AI analysis model is internally received, the model manager part may be configured to generate the reference factor by using the statistical analysis model and the learning data, and use the generated reference factor to determine the AI analysis model.

In addition, when a reference factor for determining the AI analysis model is externally received, the model manager part may be configured to transmit the received sensor data to the big data server to receive the reference factor generated by a big data platform of the big data server, and use the received reference factor to determine the AI analysis model.

In addition, when the determined AI analysis model is not stored in the storage part, the model manager part may be configured to perform control such that the big data server is requested to provide the determined AI analysis model and the determined AI analysis model is received.

In addition, the model manager part may be configured to perform control such that the driving control signal generated from the hybrid analysis part is received and the received driving control signal is transmitted to the IoT device.

In addition, the hybrid analysis part may be configured to analyze the sensor data in a hybrid manner using the AI analysis model and the statistical analysis model.

According to the present disclosure, there is provided a driving method of a modular AI engine server, the driving method including: determining, by the modular AI engine server, an AI analysis model suitable for analyzing at least one piece of sensor data received from at least one IoT device; and analyzing, by the modular AI engine server, the sensor data by using the determined AI analysis model.

In addition, the driving method may further include: storing, by the modular AI engine server, the determined AI analysis model in a modular manner; and storing, by the modular AI engine server, learning data resulting from learning based on a result of the analysis.

Advantageous Effects

According to the big data-based modular AI engine server and the driving method thereof according to the present disclosure, an AI model suitable for an IoT environment is determined and the determined AI model is used to analyze sensor data, and an AI model is modularized and only a required AI model of the modular AI model is loaded and used, so that implementation of low-end and low-power hardware can be achieved and facility cost can thus be reduced.

In addition, connection to a cloud service is minimized through an AI model that performs learning independently and analysis, so that data usage cost can be reduced.

MODE FOR INVENTION

Figure 1:
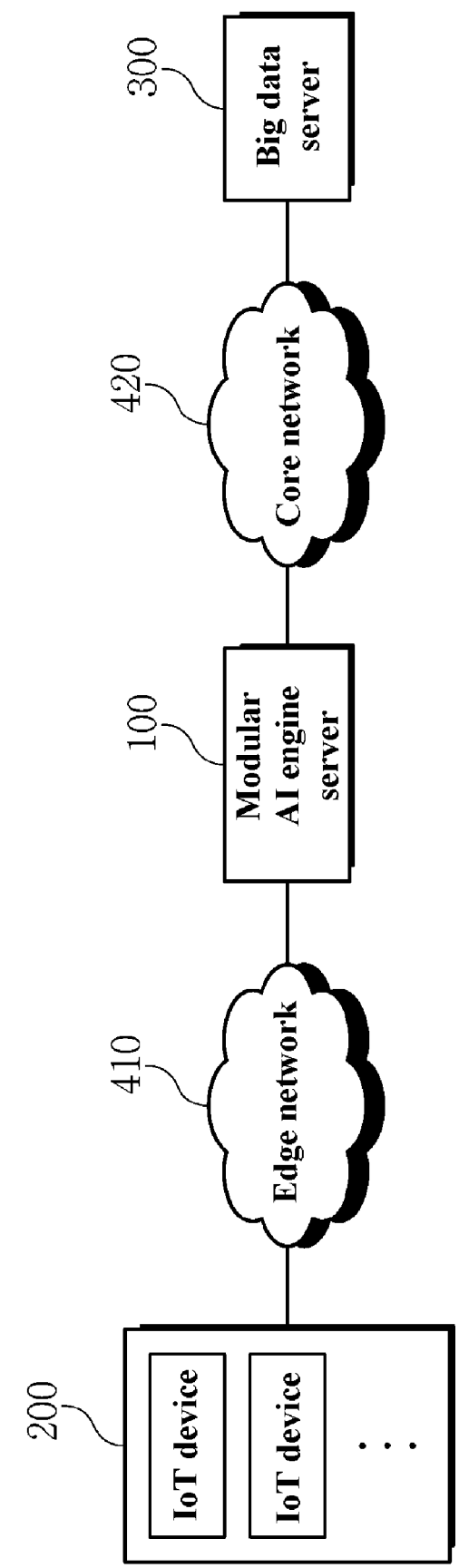
FIG. 1 is a configuration diagram illustrating a data processing system according to an embodiment of the present disclosure.

Hereinafter, embodiments of the present disclosure will be described in detail with reference to the accompanying drawings. First, it is to be noted that in assigning reference numerals to elements in the drawings, the same reference numerals designate the same elements throughout the drawings although the elements are shown in different drawings. In addition, in describing the present disclosure, it it is decided that a detailed description of know configuration or function related to the present disclosure is obvious to those skilled in the art or makes the subject matter of the present disclosure unclear, the detailed description is omitted.

FIG. 1 is a configuration diagram illustrating a data processing system according to an embodiment of the present disclosure.

Referring to FIG. 1, a data processing system 400 determines an AI model suitable for an IoT environment, and uses the determined AI model to support analysis of sensor data. Herein, the data processing system 400 modularizes an AI model and enables only a required AI model of the modular AI model to be loaded into a model manager, which manages an AI model in an in-memory database, and to be used. The data processing system 400 includes a modular AI engine server 100, IoT devices 200, and a big data server 300.

The modular AI engine server 100 is positioned between the IoT devices 200 and the big data server 300, and independently analyzes sensor data transmitted from the IoT devices 200 to minimize data transmitted to the big data server 300. Herein, the modular AI engine server 100 may use an AI model in a modular manner to analyze the sensor data. The modular AI engine server 100 may transmit a driving control signal resulting from analysis to an IoT device that has transmitted sensor data, to control the driving of the IoT device. The modular AI engine server 100 may be implemented in the form of a platform. The modular AI engine server 100 is an embedded system with the minimum quality of hardware capable of AI model learning.

The IoT devices 200 mean any electronic devices having communication modules. The IoT devices 200 collect sensor data and transmit the collected sensor data to the modular AI engine server 100. Herein, the sensor data may include biodata, image data, position data, environment data, weather data, pressure data, etc. The IoT devices 200 may be a portable terminal, a home appliance, industrial equipment, infrastructure equipment, an unmanned aerial vehicle, an self-driving vehicle, a lidar, a high-end camera, medical equipment, etc.

The big data server 300 is a server storing big data therein, and may be implemented as a big data platform. That is, the big data server 300 processes and analyzes data collected from various data sources to extract corresponding knowledge, and provides an intelligent service based on the extracted knowledge. Herein, the intelligent service means a service using an AI model. Specifically, the big data platform has scalable large-capacity processing capability, heterogeneous data collection and integrated-processing capability, rapid data access and processing capability, capability to store and manage a large amount of data, capability to analyze a large amount of heterogeneous data at a desired level, etc. For example, a big data platform service may include a multi-type message queuing system interface that causes Kafka to cooperate with Mosquitto, RabbitMQ, ZeroMQ, etc., and a Hadoop-based big data analysis interface that cooperates with SQL on Hadoop. The big data server 300 providing this service may be a server computer, a cluster computer, a super computer, or the like.

In the meantime, the data processing system 400 builds an edge network 410 between the modular AI engine server 100 and the IoT devices 200 and builds a core network 420 between the modular AI engine server 100 and the big data server 300 so that communication therebetween is performed. The edge network 410 and the core network 420 may be fiber-to-the-home (FTTH), asymmetric digital subscriber line (ADSL), a cable network, Zigbee, Bluetooth, wireless LAN (IEEE 802.11b, IEEE 802.11a, IEEE 802.11g, and IEEE 802.11n), wirelessHart (ISO/IEC62591-1), ISA100.11a (ISO/IEC 62734), Constrained Application Protocol (COAP), multi-client publish/subscribe messaging (MQTT), wireless broadband (WiBro), Wimax, 3G, High Speed Downlink Packet Access (HSDPA), 4G, and 5G.

Figure 2:
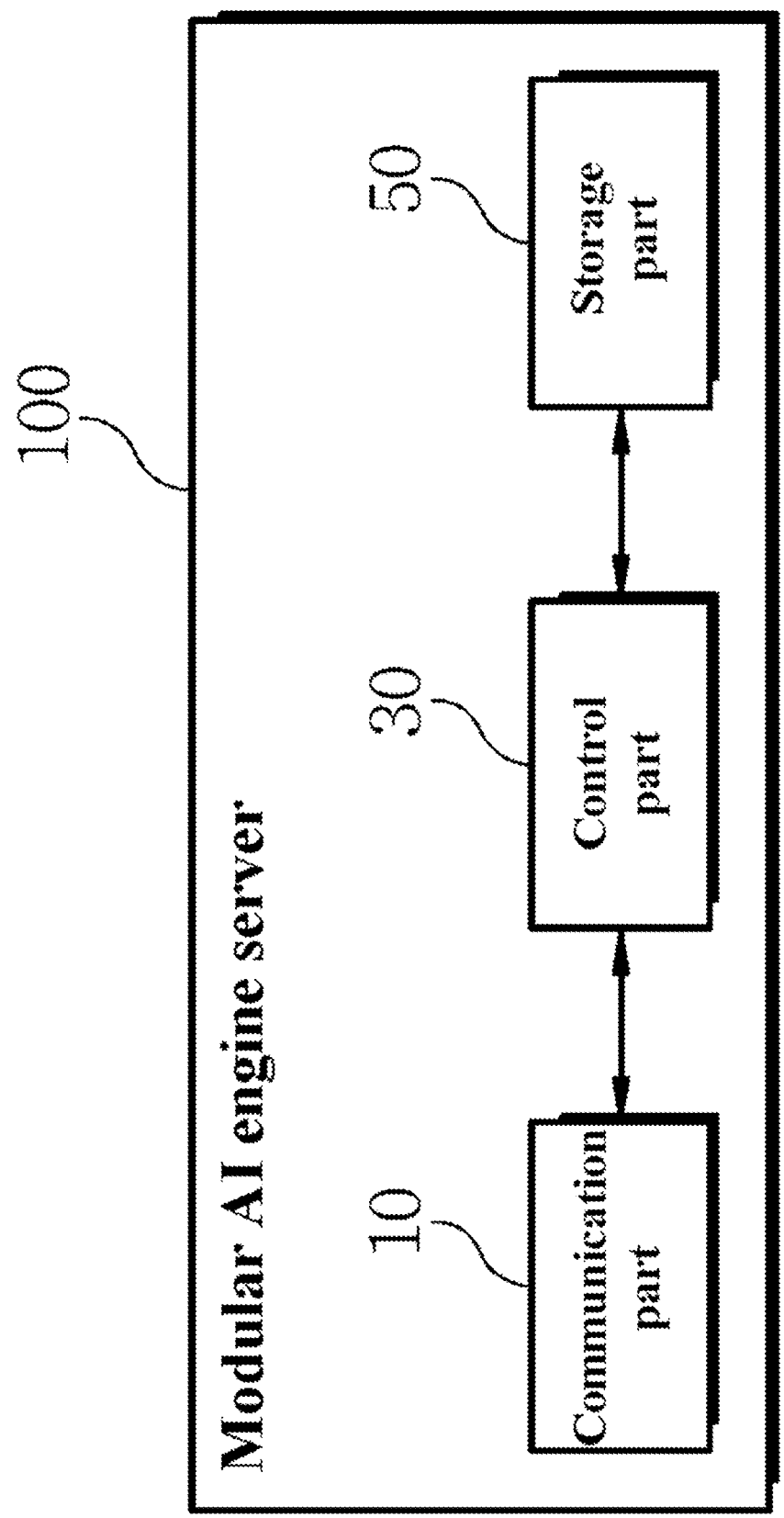
FIG. 2 is a block diagram illustrating a modular AI engine server according to an embodiment of the present disclosure.

FIG. 2 is a block diagram illustrating a modular AI engine server according to an embodiment of the present disclosure.

Referring to FIGS. 1 and 2, the modular AI engine server 100 includes a communication part 10 and a control part 30, and may further include a storage part 50.

The communication part 10 performs communication with at least one IoT device 200 and a big data server 300. The communication part 10 receives at least one piece of sensor data from an IoT device 200, and transmits a driving control signal to the IoT device 200. The communication part 10 may transmit the sensor data to the big data server 300, and may receive an AI analysis module from the big data server 300.

The control part 30 determines an AI analysis model suitable for analyzing at least one piece of sensor data received from an IoT device 200, and analyzes the sensor data by using the determined AI analysis model. Herein, the AI analysis model is modular, and only a required AI analysis model is loaded to analyze the sensor data, so that system load is reduced. The control part 30 uses the analyzed sensor data to generate a driving control signal for the IoT device that has transmitted the sensor data, and transmits the generated driving control signal to the IoT device that has transmitted the sensor data. Herein, the driving control signal is a command for controlling the driving of the IoT device, and may include an order, such as switching to/remaining in an idle state, switching to a wake-up state, indicating an action, or the like.

The storage part 50 stores therein an AI analysis model and a statistical analysis model in a modular manner. When storing a new analysis model, the storage part 50 stores the new analysis model in a modular manner like previously stored analysis models. When any analysis model is loaded into the control part 30 in response to a request, the storage part 50 enables only a module corresponding to the requested analysis model to be loaded rather than all or grouped analysis models are loaded as in the related art. In addition, the storage part 50 stores learning data therein resulting from learning based on a result of analysis. The storage part 50 may include at least one storage medium selected from the group of flash memory type, multimedia card micro type, card-type memory (for example, SD or XD memory), random-access memory (RAM), and static random-access memory (SRAM).

Figure 3:
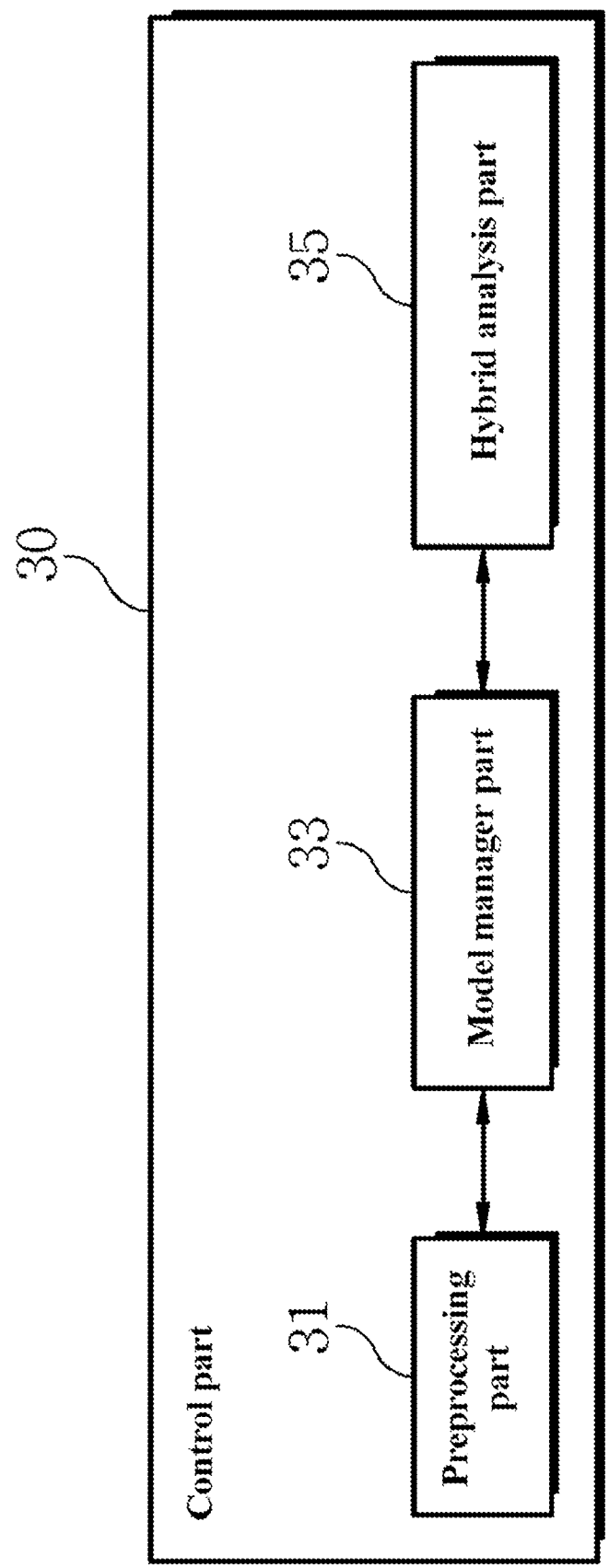
FIG. 3 is a block diagram illustrating a control part of FIG. 2.
Figure 4:
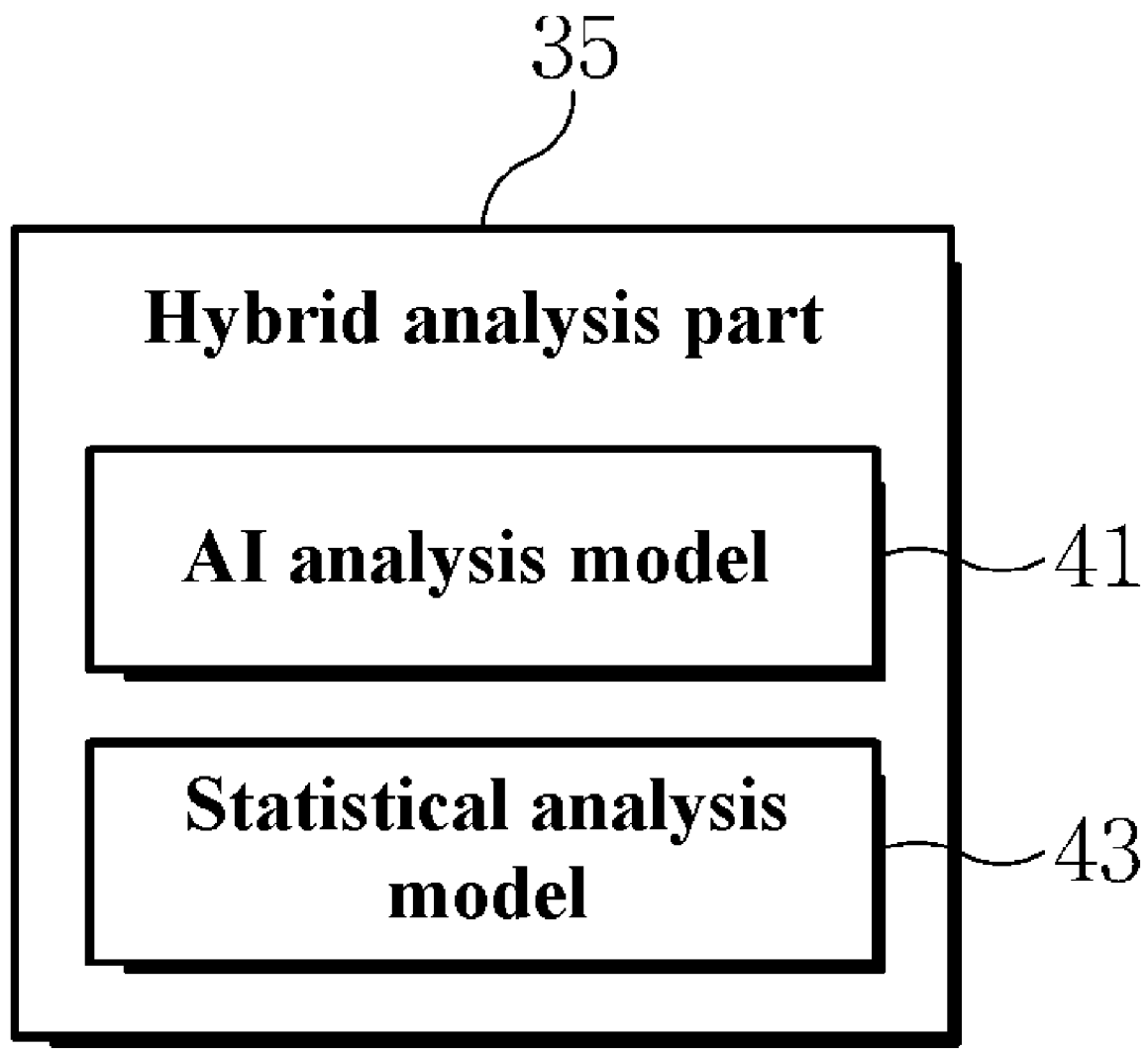
FIG. 4 is a block diagram illustrating a hybrid analysis part of FIG. 3.
Figure 5:
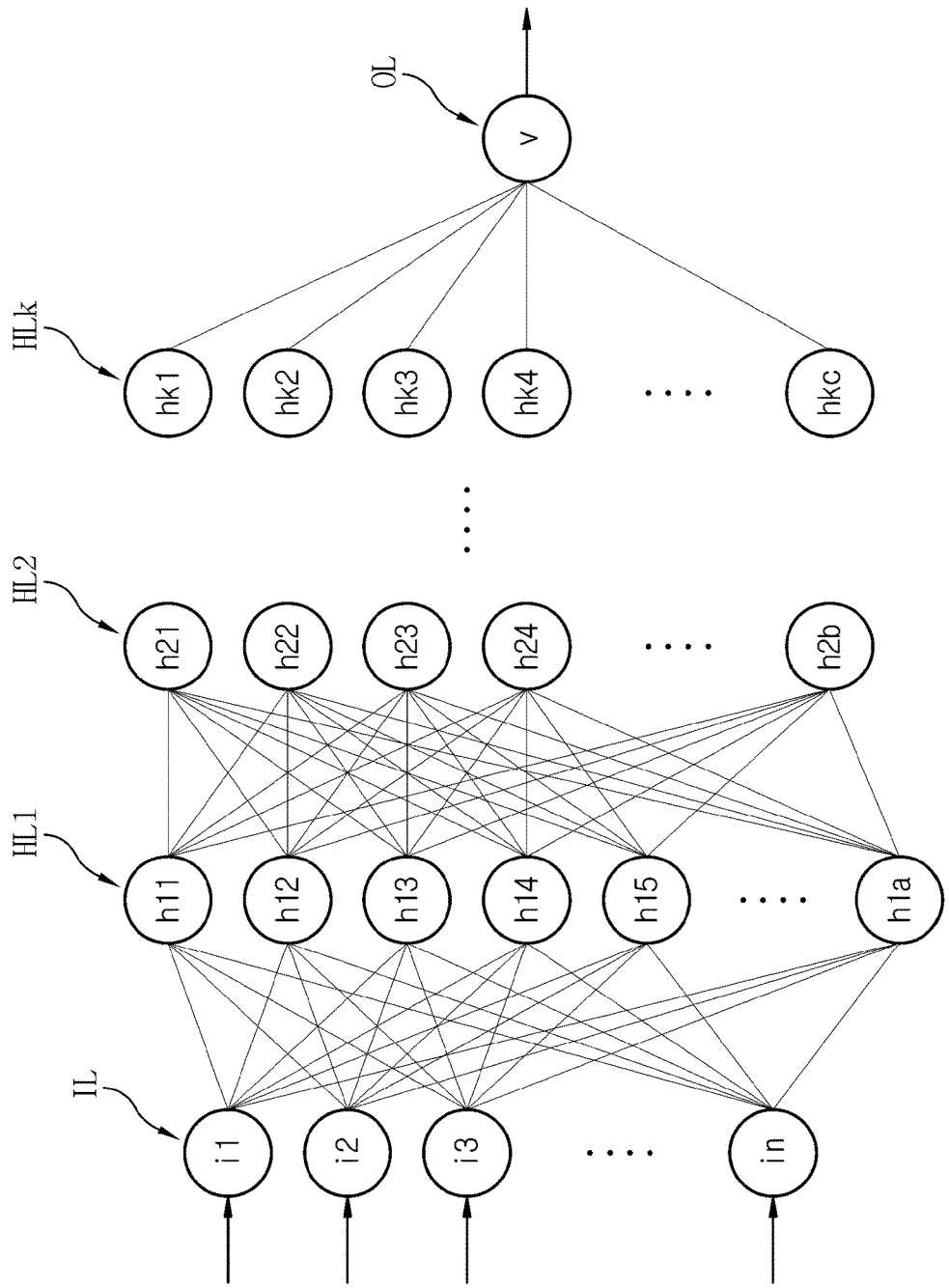
FIG. 5 is a diagram illustrating a configuration of an artificial neural network according to an embodiment of the present disclosure.
Figure 6:
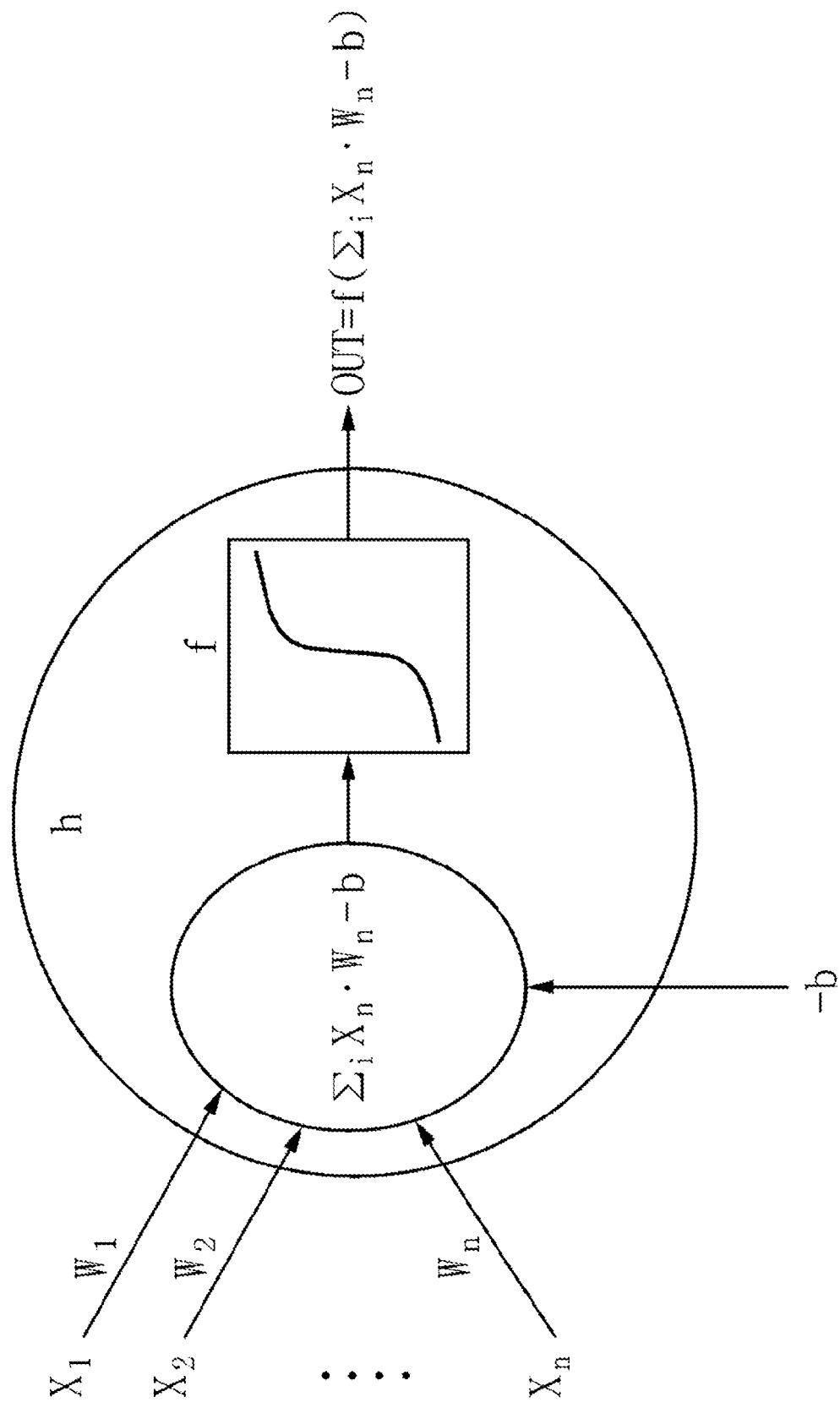
FIG. 6 is a diagram illustrating a node that performs operation in which weights are applied according to an embodiment of the present disclosure.

FIG. 3 is a block diagram illustrating a control part of FIG. 2. FIG. 4 is a block diagram illustrating a hybrid analysis part of FIG. 3. FIG. 5 is a diagram illustrating a configuration of an artificial neural network according to an embodiment of the present disclosure. FIG. 6 is a diagram illustrating a node that performs operation in which weights are applied according to an embodiment of the present disclosure.

Referring to FIGS. 1 to 6, the control part 30 includes a preprocessing part 31, a model manager part 33, and a hybrid analysis part 35.

The preprocessing part 31 preprocesses the sensor data received through the communication part 10. That is, the preprocessing part 31 collects sensor data, and matches or groups sensor data having similarity among the collected sensor data. The preprocessing part 31 samples the matched or grouped sensor data and filters the sampled sensor data. Herein, the preprocessing part 31 performs preprocessing in a parallel structure to maximize operation processing speed.

The model manager part 33 manages an AI analysis model on the basis of the preprocessed sensor data. The model manager part 33 determines an AI analysis model suitable for analyzing the sensor data, in a modular manner on the basis of at least one selected from the group of a type of the IoT device that has transmitted the sensor data, and a type and a format of the sensor data. Herein, a suitable AI analysis model is an analysis model most optimized for analyzing sensor data, and means a model that performs operation rapidly in a simple process and calculates a result value accurately. That is, the model manager part 33 may determine a tailored AI analysis model suitable for the characteristics of an IoT device and sensor data.

Herein, the model manager part 33 may internally or externally receive a reference factor for determining an AI analysis model. For example, when a reference factor for determining an AI analysis model is internally determined, the model manager part 33 estimates the reference factor by using a statistical analysis model and a pre-training model stored in the storage part 50, and determines the AI analysis model. Herein, the hybrid analysis part 35 applies sensor data to a statistical model to estimate a pattern, and finds an optimum AI analysis model matched to the pattern to determine a reference factor. In addition, when a reference factor for determining an AI analysis model is externally received, the model manager part 33 transmits sensor data to the big data server 300 to receive the reference factor generated by the big data platform of the big data server 300, and uses the received reference factor to determine the AI analysis model. Herein, the big data server 300 uses the big data platform to estimate a reference factor so that the most suitable AI analysis model capable of classification, clustering, and other analysis for a pattern of sensor data is generated, and generates the AI model.

The model manager part 33 loads the determined AI analysis model from the storage part 50 and transmits the AI analysis model to the hybrid analysis part 35. Herein, when the storage part 50 does not store therein the determined AI analysis model, the model manager part 33 requests the big data server 300 to provide the determined AI analysis model, receives the determined AI analysis model in response to the request, provides the received AI analysis model to the hybrid analysis part 35, and stores the received AI analysis model in the storage part 50.

The model manager part 33 performs control such that a driving control signal generated through the AI analysis model transmitted to the hybrid analysis part 35 is received from the hybrid analysis part 35 and the received driving control signal is transmitted to the IoT device that has transmitted the sensor data. Herein, the driving control signal is a command for controlling the driving of the IoT device, and may include an order, such as switching to/remaining in an idle state, switching to a wake-up state, indicating an action, or the like.

The hybrid analysis part 35 receives the determined AI analysis model from the model manager part 33, and uses the received AI analysis model to analyze the sensor data. Herein, the hybrid analysis part 35 may analyze the sensor data by further using the statistical analysis model 43 in addition to the received AI analysis model 41. That is, the hybrid analysis part 35 generates a driving control signal, which is an optimum result value, in a hybrid manner in which analysis of the sensor data is based on the AI analysis model 41 with the statistical analysis model 43 as a supplement. Herein, the AI analysis model 41 may be various artificial intelligence models, such as an artificial neural network (ANN), machine learning, deep learning, etc.

For example, FIG. 5 shows an artificial neural network that is an example of the AI analysis model 41, and as shown in the drawing, the artificial neural network includes a plurality of layers. The plurality of layers include an input layer (IL), hidden layers (HLs, HL1 to HLk), and an output layer (OL).

In addition, each of the plurality of layers (IL, HLs, and OL) includes one or more nodes. For example, as shown in the drawing, the input layer (IL) may include n input nodes (i1~in), and the output layer (OL) may include one output node (v). In addition, a first hidden layer (HL1) among the hidden layers (HLs) may include a nodes (h11~h1*a*), a second hidden layer (HL2) may include b nodes (h21~h2*b*), and a k-th hidden layer (HLk) may include c nodes (hk1~hkc).

Each node at the plurality of layers performs operation. In particular, the plurality of nodes at the different layers are connected through channels (denoted by dotted lines) having weights (w). In other words, an operation result of any one node is input to a node at the subsequent layer after parameters of the artificial neural network are applied to the operation result, wherein the parameters include a weight (w) or a threshold value (b). This connection relation will be described with respect to a node.

FIG. 6 shows an example of a node (h) according to an embodiment of the present disclosure. The node of FIG. 6 is described as one of hidden nodes (h), but this description may be applied in common to all nodes included in the AI analysis model 41. The operation of the node (h) is performed according to [Equation 1] below.

$$y = F\left(\sum x_n \cdot w_n - b\right)$$ [Equation 1]

Herein, the function F means an activation function. In addition, x is a node value according to an operation result of each of the plurality of nodes at the preceding layer, and means an input to the node (h) at the subsequent layer. Such inputs may be expressed as x=[x1, x2, . . . , xn]. w is weights corresponding to inputs x, and may be expressed as w=[w1, w2, . . . , wn]. According to Equation 1, the node (h) applies weights w=[w1, w2, . . . , wn] to inputs x=[x1, x2, . . . , xn], which are respective node values of the plurality of nodes at the preceding layer, and adopts function F to a result thereof. Herein, parameter b is a threshold value, and the threshold value b prevents a corresponding node from being activated when the value of $$\sum x_n \cdot w_n$$

in [Equation 1] is less than the threshold value.

For example, it is assumed that there are three nodes (n=3) at the preceding layer of the node (h). Accordingly, there are three inputs x1, x2, and x3 and three weights w1, w2, and w3 for the node (h). The node (h) receives values obtained by multiplying three inputs x1, x2, and x3 by weights w1, w2, and w3 corresponding thereto, and adds all the values, and applies the sum value to a transfer function to calculate an output. Specifically, it is assumed that inputs [x1, x2, x3]=0.5, −0.3, 0 and weights w=[w1, w2, w3]=4, 5, 2. In addition, assuming that activation function F is 'sgn( )' and the threshold value is 0.01, an output is calculated as follows through the operation according to [Equation 1].

$$x1 \times w1 = 0.5 \times 0.19 = 0.095$$

$$x2 \times w2 = -0.3 \times 0.25 = -0.075$$

$$x3 \times w3 = 0 \times 0.66 = 0$$

$$0.095 + (-0.075) + 0 = 0.02$$

$$\text{With } b = 0.01, \text{sgn}(0.02 - 0.01) = 1$$

In this way, each of the plurality of nodes at the plurality of layers generated from the artificial neural network receives a value obtained by applying the weights w1, w2, and w3 and the threshold value b, which are the parameters of the artificial neural network, to the node values x1, x2, and x3 at the preceding layer, and performs the operation by activation function F to calculate an output value OUT. When the subsequent layer exists, the calculated output value OUT is an input to a node at the subsequent layer. That is, any one node at any one layer of an AI analysis model receives a value obtained by applying a weight or a threshold value to an output of a node at the preceding layer, and performs the operation by activation function F to transmit a result of the operation to the subsequent layer.

The overall operation of the AI analysis model 41 is performed as follows. First, sensor data is used as input data for the AI analysis model. The input data may be converted into an input feature vector for input. An input feature vector IV has a plurality of element values iv1~ivn corresponding to the plurality of input nodes (i1~in) of the input layer (IL) of the AI analysis model 41. Accordingly, when the input feature vector IV=[iv1~ivn] is input to the plurality of input nodes (i1~in) at the input layer (IL), each of a plurality of first hidden nodes (h11~h1a) at the first hidden layer (HL1) applies weights and a threshold value to the plurality of element values iv1~ivn of the plurality of input nodes (i1~in), and performs the operation according to the activation function on each of the plurality of element values of the input feature vector to which the weights and the threshold value are applied, so as to calculate a plurality of first hidden node values.

Next, each of the plurality of second hidden nodes (h21~h2b) at the second hidden layer (HL2) applies a weight and a threshold value to each of the plurality of first hidden node values of the plurality of first hidden nodes (h11~h1a), and performs the operation according to the activation function on each of the plurality of first hidden node values to which the weights and the threshold value are applied, so as to calculate a plurality of second hidden node values. In this way, within the hidden layers (HLs), previous node values are transmitted with weights applied, and current node values are calculated through operation. By repeating this process, a plurality of k-th hidden node values of a plurality of k-th hidden nodes (hk1~hkc) at the k-th hidden layer (HLk) may be calculated.

Accordingly, the output node (v) at the output layer (OL) receives values (denoted by dotted lines) obtained by applying the weights w=[w1, w2, . . . , wc] to the plurality of k-th hidden node values of the plurality of k-th hidden nodes (hk1~hkc) at the k-th hidden layer (HLk), and adds all the received values, and subtracts a threshold value, and performs the operation according to the activation function on a resulting value to calculate an output value. The output value calculated by the output node (v) may be an estimated value of a driving control value.

As described above, the hybrid analysis part 35 estimates a result value for a driving control signal through the artificial neural network, but is not limited thereto, and may estimate a result value for a driving control signal by using various AI analysis model and statistical analysis models.

Figure 7:
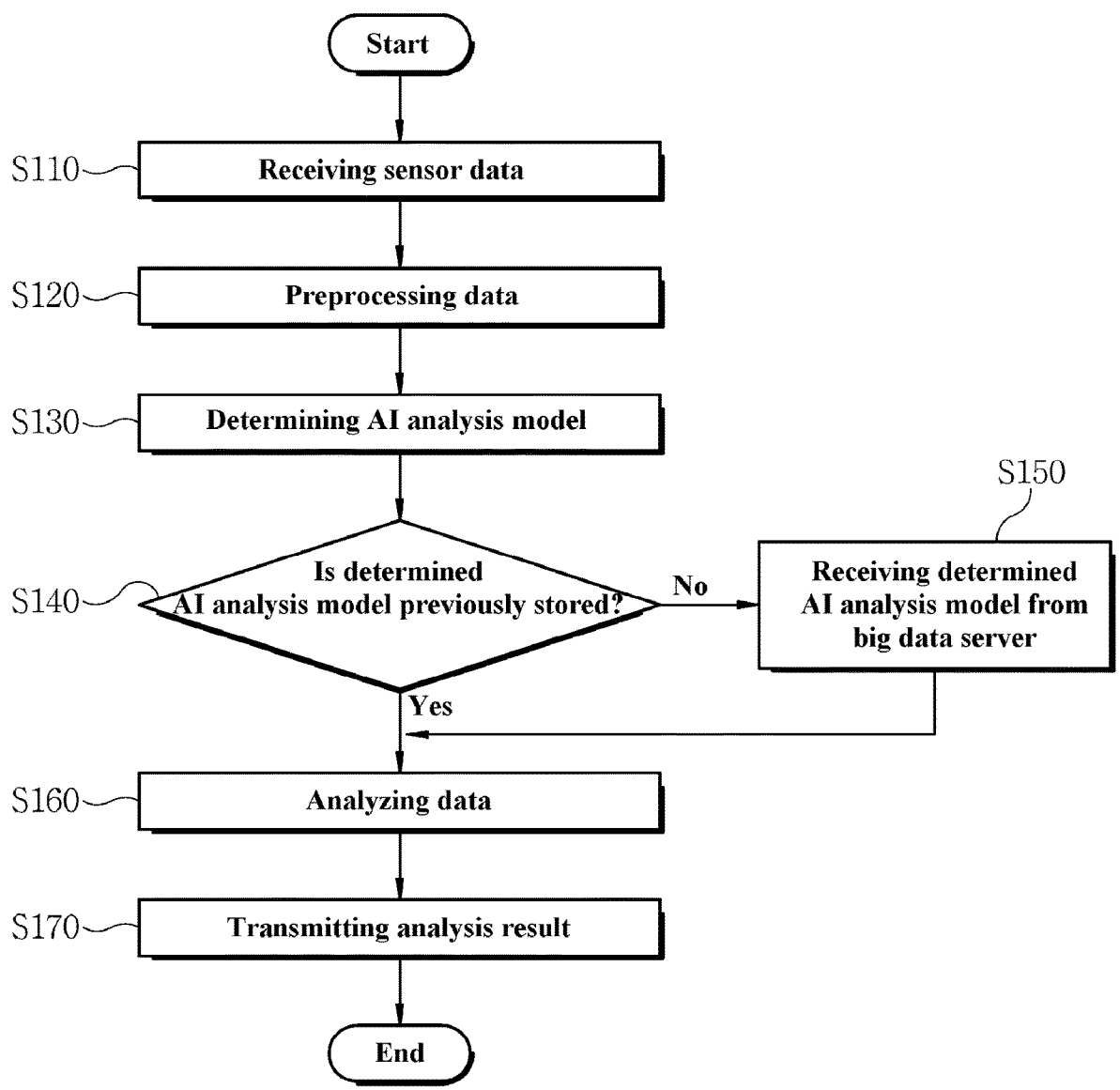
FIG. 7 is a flowchart illustrating a driving method of a modular AI engine server according to an embodiment of the present disclosure.

FIG. 7 is a flowchart illustrating a driving method of a modular AI engine server according to an embodiment of the present disclosure.

Referring to FIGS. 1 and 7, a driving method of a modular AI engine server 100 (hereinafter, referred to as the 'driving method') determines an AI model suitable for an IoT environment and uses the determined AI model to analyze sensor data, and modularizes an AI model and loads and uses only a required AI model of the modular AI model, so that implementation of low-end and low-power hardware can be achieved and facility cost can thus be reduced. In addition, the driving method minimizes connection to a cloud service through an AI model that performs learning independently and analysis, so that data usage cost can be reduced.

In step S110, the modular AI engine server 100 receives sensor data. The modular AI engine server 100 receives at least one piece of sensor data from an IoT device 200. Herein, the sensor data may include biodata, image data, position data, environment data, weather data, pressure data, or the like. The IoT device 200 may be a portable terminal, a home appliance, industrial equipment, infrastructure equipment, an unmanned aerial vehicle, an self-driving vehicle, a lidar, a high-end camera, medical equipment, or the like.

In step S120, the modular AI engine server 100 preprocesses the received sensor data. The modular AI engine server 100 collects sensor data, and matches or groups sensor data having similarity among the collected sensor data. The modular AI engine server 100 samples the matched or grouped sensor data and filters the sampled sensor data. Herein, the modular AI engine server 100 may perform preprocessing in a parallel structure.

In step S130, the modular AI engine server 100 determines an AI analysis model suitable for analyzing the sensor data, in a modular manner on the basis of at least one selected from the group of a type of the IoT device that has transmitted the sensor data, and a type and a format of the sensor data. Herein, a suitable AI analysis model is an analysis model most optimized for analyzing sensor data, and means a model that performs operation rapidly in a simple process and calculates a result value accurately. That is, the modular AI engine server 100 may determine a tailored AI analysis model suitable for the characteristics of an IoT device and sensor data.

Specifically, the modular AI engine server 100 may internally or externally receive a reference factor for determining an AI analysis model, and may use the received reference factor to determine an AI analysis model. For example, when a reference factor for determining an AI analysis model is internally received, the modular AI engine server 100 generates the reference factor on the basis of factors included in the sensor data by using a pre-stored statistical analysis model and learning data, and uses the generated reference factor to determine an AI analysis model. In addition, when a reference factor for determining an AI analysis model is externally received, the modular AI engine server 100 transmits the sensor data to the big data server 300 to receive the reference factor generated by the big data platform of the big data server 300, and uses the received reference factor to determine the AI analysis model.

In step S140, the modular AI engine server 100 determines whether the determined AI analysis model is previously stored. When the AI analysis model is previously stored, the modular AI engine server 100 goes to step S160, or when the AI analysis model is not previously stored, the modular AI engine server 100 goes to step S150.

In step S150, the modular AI engine server 100 receives the determined AI analysis model from the big data server 300. To this end, the modular AI engine server 100 may request the big data server 300 to provide the determined AI analysis model. In addition, the modular AI engine server 100 may store the received AI analysis model in a modular manner so that the AI analysis model is loaded in a modular manner later.

In step S160, the modular AI engine server 100 uses the determined AI analysis module and a statistical analysis module to analyze the sensor data. Herein, the modular AI engine server 100 generates a driving control signal, which is an optimum result value, in a hybrid manner in which analysis of the sensor data is based on the AI analysis model with the statistical analysis model as a supplement. Herein, the driving control signal is a command for controlling the driving of the IoT device, and may include an order, such as switching to/remaining in an idle state, switching to a wake-up state, indicating an action, or the like.

In step S170, the modular AI engine server 100 may transmit the generated driving control signal to the IoT device. Accordingly, the modular AI engine server 100 is capable of controlling the driving of the IoT device.

In addition, the present disclosure may be implemented as computer-readable code in a computer-readable recording medium. Examples of the computer-readable recording medium include all types of recording devices in which data readable by a computer device is stored. Examples of the computer-readable recording medium include a hard disk, ROM, RAM, CD-ROM, a magnetic tape, a floppy disk, an optical data storage device, etc., and also include those implemented in the form of carrier waves (for example, transmission over the Internet).

Although the exemplary embodiments of the present disclosure have been illustrated and described, the present disclosure is not limited to the aforementioned particular exemplary embodiments, and can be variously modified by those skilled in the art without departing the scope of the present disclosure defined in the claims. The modifications are within the scope of the claims.

DESCRIPTION OF THE REFERENCE
NUMERALS IN THE DRAWINGS

10: communication part
30: control part
31: preprocessing part
33: model manager part
35: hybrid analysis part
41: AI analysis model
43: statistical analysis model
50: storage part
100: modular AI engine server
200: IoT device
300: big data server
400: data processing system
410: edge network
420: core network

The invention claimed is:

1. A big data-based modular AI engine server, comprising:
a communication part configured to perform, using the big data-based modular AI engine server, communication with at least one Internet of Things (IoT) device and a big data server; and
a control part configured to determine, using the big data-based modular AI engine server, an AI analysis model suitable for analyzing at least one piece of sensor data received from the IoT device from a plurality of AI analysis models, and analyze, using the big data-based modular AI engine server, the sensor data by using the determined AI analysis model,
wherein the control part comprises:
a model manager part configured to determine, using the big data-based modular AI engine server, the AI analysis model suitable for analyzing the sensor data, based on a reference factor, in a modular manner on the basis of at least one selected from a group of a type of the IoT device, and a type and a format of the sensor data; and
a hybrid analysis part configured to analyze, using the big data-based modular AI engine server, the sensor data on the basis of the determined AI analysis model and a statistical analysis model, and generate, using the big data-based modular AI engine server, a driving control signal for the IoT device that has transmitted the sensor data, and
wherein the model manager part is configured to perform, using the big data-based modular AI engine server, a control, such that the driving control signal generated from the hybrid analysis part is received and the received driving control signal is transmitted to the IoT device.

2. The big data-based modular AI engine server of claim 1, further comprising
a storage part in which the AI analysis model and the statistical analysis model are stored in the modular manner and learning data resulting from learning based on a result of the analysis is stored.

3. The big data-based modular AI engine server of claim 2, wherein when the reference factor for determining the AI analysis model is internally received, the model manager part is configured to generate the reference factor by using the statistical analysis model and the learning data, and use the generated reference factor to determine the AI analysis model.

4. The big data-based modular AI engine server of claim 1, wherein when the reference factor for determining the AI analysis model is externally received, the model manager part is configured to transmit the received sensor data to the big data server to receive the reference factor generated by a big data platform of the big data server, and use the received reference factor to determine the AI analysis model.

5. The big data-based modular AI engine server of claim 2, wherein when the determined AI analysis model is not stored in the storage part, the model manager part is configured to perform control such that the big data server is requested to provide the determined AI analysis model and the determined AI analysis model is received.

6. The big data-based modular AI engine server of claim 1, wherein the hybrid analysis part is configured to analyze the sensor data in a hybrid manner using the AI analysis model and the statistical analysis model.

7. A driving method of a modular AI engine server, the driving method comprising:

determining, by the modular AI engine server, an AI analysis model suitable for analyzing at least one piece of sensor data received from at least one Internet of Things (IoT) device from a plurality of AI analysis models; and analyzing, by the modular AI engine server, the sensor data by using the determined AI analysis model, wherein the determining comprises:

determining, using the modular AI engine server, the AI analysis model suitable for analyzing the sensor data, based on a reference factor, in a modular manner on the basis of at least one selected from a group of a type of the IoT device, and a type and a format of the sensor data, wherein the analyzing comprises:

analyzing, using the modular AI engine server, the sensor data on the basis of the determined AI analysis model and a statistical analysis model, and generating a driving control signal for the IoT device that has transmitted the sensor data, and wherein the determining further comprises:

performing, using the modular AI engine server, a control, such that the driving control signal is received and the received driving control signal is transmitted to the IoT device.

8. The driving method of claim 7, further comprising:

storing, by the modular AI engine server, the determined AI analysis model in the modular manner; and storing, by the modular AI engine server, learning data resulting from learning based on a result of the analysis.

\* \* \* \* \*